United States Patent [19]

Hirai et al.

[11] Patent Number: 5,450,537
[45] Date of Patent: Sep. 12, 1995

[54] METHOD AND APPARATUS FOR COMPLETING A PARTIALLY COMPLETED DOCUMENT IN ACCORDANCE WITH A BLANK FORM FROM DATA AUTOMATICALLY RETRIEVED FROM A DATABASE

[75] Inventors: Chiaki Hirai, Tokyo; Hidefumi Kondo, Yamato, both of Japan

[73] Assignee: Hitachi, Ltd., Tokyo, Japan

[21] Appl. No.: 147,894

[22] Filed: Nov. 4, 1993

Related U.S. Application Data

[63] Continuation of Ser. No. 621,622, Dec. 3, 1990, abandoned.

[30] Foreign Application Priority Data

Dec. 8, 1989 [JP] Japan .................................. 1-320207

[51] Int. Cl.$^6$ .............................................. G06F 17/30
[52] U.S. Cl. .................................... 395/149; 382/187
[58] Field of Search ................ 395/149, 148, 60, 68, 395/145, 110; 382/2, 13, 14, 61, 9, 3; 345/113

[56] References Cited

U.S. PATENT DOCUMENTS

| | | | |
|---|---|---|---|
| 4,542,378 | 9/1985 | Suganuma et al. | 345/113 |
| 4,574,395 | 3/1986 | Kato | 382/61 |
| 4,949,392 | 8/1990 | Barshi et al. | 382/61 |
| 5,006,992 | 4/1991 | Skeirik | 395/68 |
| 5,014,327 | 5/1991 | Potter et al. | 382/14 |
| 5,034,989 | 7/1991 | Loh | 382/13 |
| 5,047,960 | 9/1991 | Sloan | 395/149 |
| 5,058,185 | 10/1991 | Morris et al. | 382/41 |
| 5,108,206 | 8/1992 | Yoshida | 395/110 |
| 5,159,667 | 10/1992 | Borrey et al. | 395/148 |
| 5,179,649 | 1/1993 | Masuzaki et al. | 395/148 |

FOREIGN PATENT DOCUMENTS 63-174162 7/1988 Japan .
1-119885 11/1989 Japan .

OTHER PUBLICATIONS

"Base of Database System" by T. Uemura printed by Ohm Co. Ltd., pp. 123-128. (English translation unavailable).

*Primary Examiner*—Mark K. Zimmerman
*Assistant Examiner*—Michael S. Smith
*Attorney, Agent, or Firm*—Fay, Sharpe, Beall, Fagan, Minnich & McKee

[57] ABSTRACT

A method and apparatus is provided for completing a document in accordance with a blank tabularized form document from data automatically retrieved from a database. An image of the blank form document is read into the system as image data from which a format of the blank form document and key information is determined. Supplemental data relating to the key information is automatically retrieved from a database and outputted in accordance with recognized parts of the original blank form document. In a second embodiment, the retrieved data is edited before being outputted. The data automatically retrieved from the database is selectively printed onto the original form document or onto a second form document.

19 Claims, 10 Drawing Sheets

| APPLICATION | |
|---|---|
| PLEASE FILL IN THE BLANKS | |
| YOUR NAME | MASAKAZU HITACHI |
| YOUR AGE | 26 |
| YOUR ADDRESS | CHIBA CITY 1-1, CHIBA PREFECTURE |
| YOUR TELEPHONE No. | 00-123-4567 |
| YOUR OCCUPATION | SOFTWARE ENGINEER |

SELECT     A TRAIN OF ITEMS

FROM       TABLE NAME

WHERE     SEARCH CONDITION

FIG. 7

| APPLICATION | |
|---|---|
| PLEASE FILL IN THE BLANKS | |
| YOUR NAME | MASAKAZU HITACHI |
| YOUR AGE | |
| YOUR ADDRESS | |
| YOUR TELEPHONE No. | |
| YOUR OCCUPATION | |

FIG. 8

| ITEM 201 | STANDARD ITEM 202 | DATA 203 |
|---|---|---|
| YOUR NAME | | MASAKAZU HITACHI |
| YOUR AGE | | NULL |
| YOUR ADDRESS | | NULL |
| YOUR TELEPHONE No. | | NULL |
| YOUR OCCUPATION | | NULL |

FIG. 9

| ITEM | STANDARD ITEM |
|---|---|
| NAME | NAME |
| YOUR NAME | NAME |
| FULL NAME | NAME |
| AGE | AGE |
| YOUR AGE | AGE |
| SEX | SEX |
| ADDR. | ADDRESS |
| ADDRESS | ADDRESS |
| TEL. | TELEPHONE No. |
| TELEPHONE No. | TELEPHONE No. |
| OCCUPATION | OCCUPATION |
| YOUR OCCUPATION | OCCUPATION |
| COMPANY NAME | COMPANY |
| OFFICE NAME | COMPANY |
| COMPANY'S TELEPHONE No. | COMPANY'S TELEPHONE No. |

301 — ITEM column; 302 — STANDARD ITEM column

FIG. 10

| ITEM | STANDARD ITEM | DATA |
|---|---|---|
| YOUR NAME | NAME | MASAKAZU HITACHI |
| YOUR AGE | AGE | NULL |
| YOUR ADDRESS | ADDRESS | NULL |
| YOUR TELEPHONE No. | TELEPHONE No. | NULL |
| YOUR OCCUPATION | OCCUPATION | NULL |

SELECT  NAME, AGE, ADDRESS, TELEPHONE No., OCCUPATION

FROM  DATA TABLE

WHERE  NAME = MASAKAZU HITACHI

FIG. 12

DATA TABLE

| NAME | AGE | SEX | ADDRESS | TELEPHONE No. | OCCUPATION | COMPANY | COMPANY'S TELEPHONE No. |
|---|---|---|---|---|---|---|---|
| MASAKAZU HITACHI | 26 | MAN | CHIBA CITY 1-1, CHIBA PREFECTURE | 00-123 -4567 | SOFTWARE ENGINEER | HITACHI | 044-966 -9111 |
| MASAKO HITACHI | 26 | WOMAN | CHIBA CITY 1-1, CHIBA PREFECTURE | 00-123 -4567 | SOFTWARE ENGINEER | HITACHI | 044-966 -9111 |
| SHŌICHI HITACHI | 13 | MAN | CHIBA CITY 1-1, CHIBA PREFECTURE | 00-123 -4567 | | | |
| SHŌJI HITACHI | 12 | MAN | CHIBA CITY 1-1, CHIBA PREFECTURE | 00-123 -4567 | | | |

FIG. 13

| ITEM | STANDARD ITEM | DATA |
|---|---|---|
| YOUR NAME | NAME | MASAKAZU HITACHI |
| YOUR AGE | AGE | 26 |
| YOUR ADDRESS | ADDRESS | CHIBA CITY 1-1, CHIBA PREFECTURE |
| YOUR TELEPHONE No. | TELEPHONE No. | 00-123-4567 |
| YOUR OCCUPATION | OCCUPATION | SOFTWARE ENGINEER |

FIG. 14

APPLICATION

PLEASE FILL IN THE BLANKS

| YOUR NAME | MASAKAZU HITACHI |
|---|---|
| YOUR AGE | 26 |
| YOUR ADDRESS | CHIBA CITY 1-1, CHIBA PREFECTURE |
| YOUR TELEPHONE No. | 00-123-4567 |
| YOUR OCCUPATION | SOFTWARE ENGINEER |

METHOD AND APPARATUS FOR COMPLETING A PARTIALLY COMPLETED DOCUMENT IN ACCORDANCE WITH A BLANK FORM FROM DATA AUTOMATICALLY RETRIEVED FROM A DATABASE

This is a continuation of U.S. application Ser. No. 07/621,622 filed Dec. 3, 1990, now abandoned.

BACKGROUND OF THE INVENTION

1. Field of the Invention

The present invention relates to a method and apparatus for making a document in accordance with a form from data automatically retrieved from a database.

2. Description of the Related Art

As a typical example of printing data in accordance with a predetermined form, address writing of a post card is well known in a word processor. In this technique, information relating to the form of the post card is preregistered in the word processor, and a document is displayed or printed in accordance with that information. On the other hand, when data is to be outputted on an arbitrary blank form, analysis of the form based on an input image, retrieval of data to be written and outputting of the data in accordance with the form are required.

A system for analyzing a form based on an input image is disclosed in JP-A-1-119885. In this system, a document having a table format is inputted as an image, and ruled lines and words in the table are detected from the input image. A database system is known as a system for retrieving data. It is shown in "Base of Database System"-0 by T. Uemura and printed by Ohm Co., Ltd., pages 123-128. In this reference, a search command to a Relational database is written in SQL.

Outputting of data in accordance with a format is disclosed in JP-A-63-174162. In this system, a form of a sheet is read into a document processor such as a word processor and a user enters a document in accordance with the form while he/she watches the form displayed on a screen, and the inputted document is outputted in accordance with the form.

However, the following problems were encountered in the prior art systems.

First, in the system disclosed in JP-A-1-119885, only the ruled lines and the words in a table are recognized and no consideration is paid to the printing with the form based on the recognition results.

In the method described in "base of Database System", a user must use SQL to retrieve data.

In the system disclosed in JP-A-63-174162, a user must enter data while he/she watches a terminal screen even if a document to be made is a simple one such as a personal history.

For those problems, a method for storing data to be written on a sheet in a database, automatically retrieving the data and outputting the data may be used. However, in this method, the condition to search the database must be automatically generated.

SUMMARY OF THE INVENTION

In the light of the above, it is an object of the present invention to provide a method for automatically performing processing from the reading of a form of a blank to the outputting data on the blank or another blank, without requiring a user to write all data onto the blank, and a document making system for the same.

In order to achieve the above object, the method of the present invention includes the steps of:
  reading a table with a blank as image data by an image input unit;
  recognizing a set of items and written data in the table from the read image data; and
  retrieving data from a database on a condition that data has been registered in items.

The above method further includes a step of outputting the data retrieved in the retrieval step on the blank in accordance with the form.

In the method of the present invention, the form of the blank and the pre-written key information such as the name of a person are entered by the image input unit as the image data, and the items and the key information are recognized from the entered image data. Therefore, the individual data can be retrieved in accordance with the entered key information.

In addition, the retrieved data can be outputted on the blank in accordance with the form.

BRIEF DESCRIPTION OF THE DRAWINGS

FIG. 7 shows a blank;

FIG. 8 shows a buffer table after the recognition of data;

FIG. 9 shows a content of a standard item table;

FIG. 10 shows a buffer table after standardization of the items;

FIG. 11 shows a generated search command;

FIG. 12 shows a portion of a content of a database used in the first embodiment;

FIG. 13 shows a buffer table after the search of the database;

FIG. 14 shows a document outputted in accordance with a form; and

DESCRIPTION OF PREFERRED EMBODIMENTS

Embodiments of the document making system of the present invention are now explained in detail with reference to the accompanying drawings.

Figure 1:
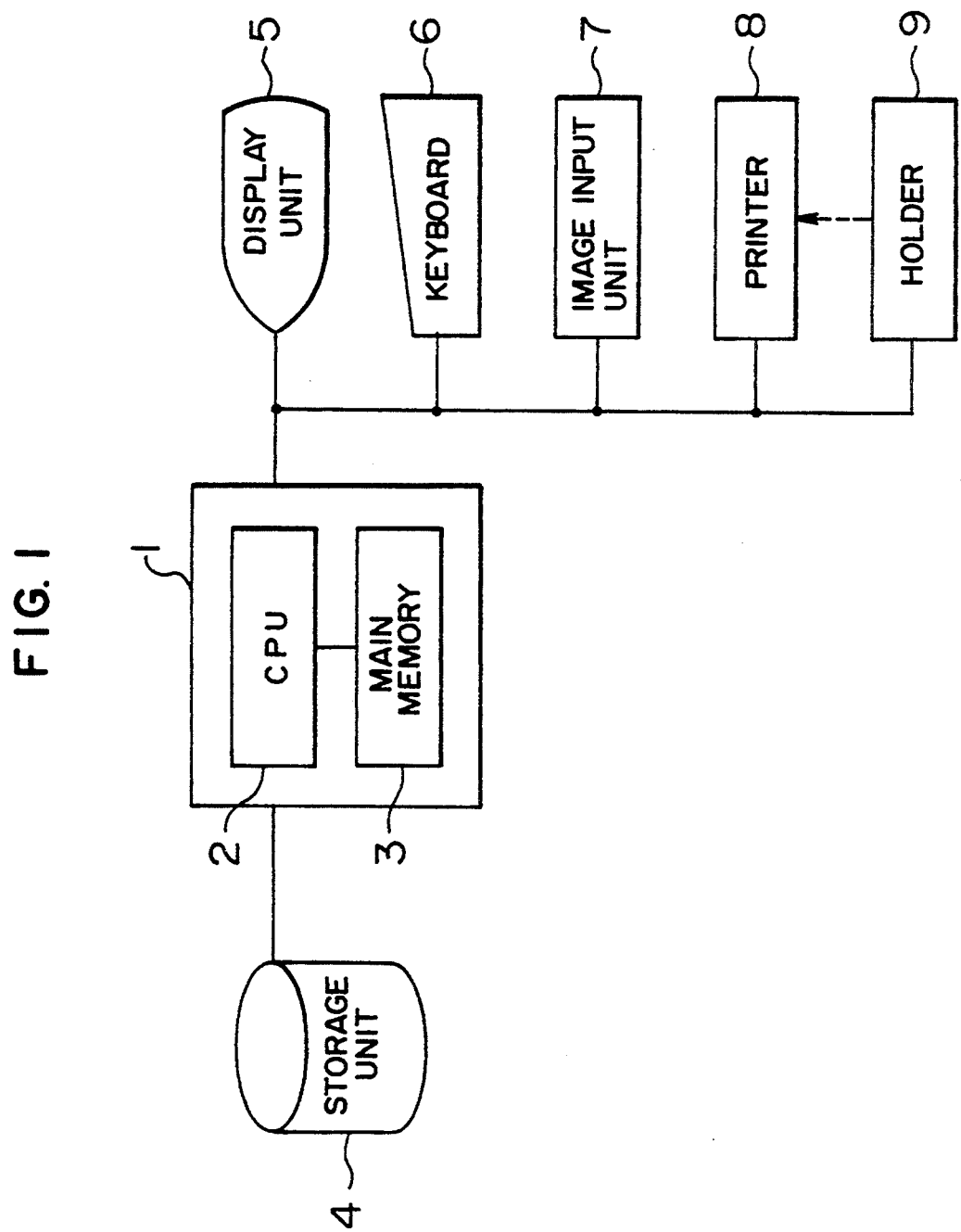
FIG. 1 is a block diagram showing a configuration of a document making system in accordance with a first embodiment of the present invention.

Referring first to FIG. 1, a hardware configuration of the document making system in accordance with a first embodiment of the present invention is explained.

Numeral 1 denotes a computer system which includes a CPU 2 and a main memory 3. Numeral 4 denotes a storage unit, numeral 5 a display unit, numeral 6 a keyboard, numeral 7 an image input unit for inputting a form of a blank, numeral 8 a printer, and numeral 9 a holder which accommodates various types of blanks.

Figure 2:
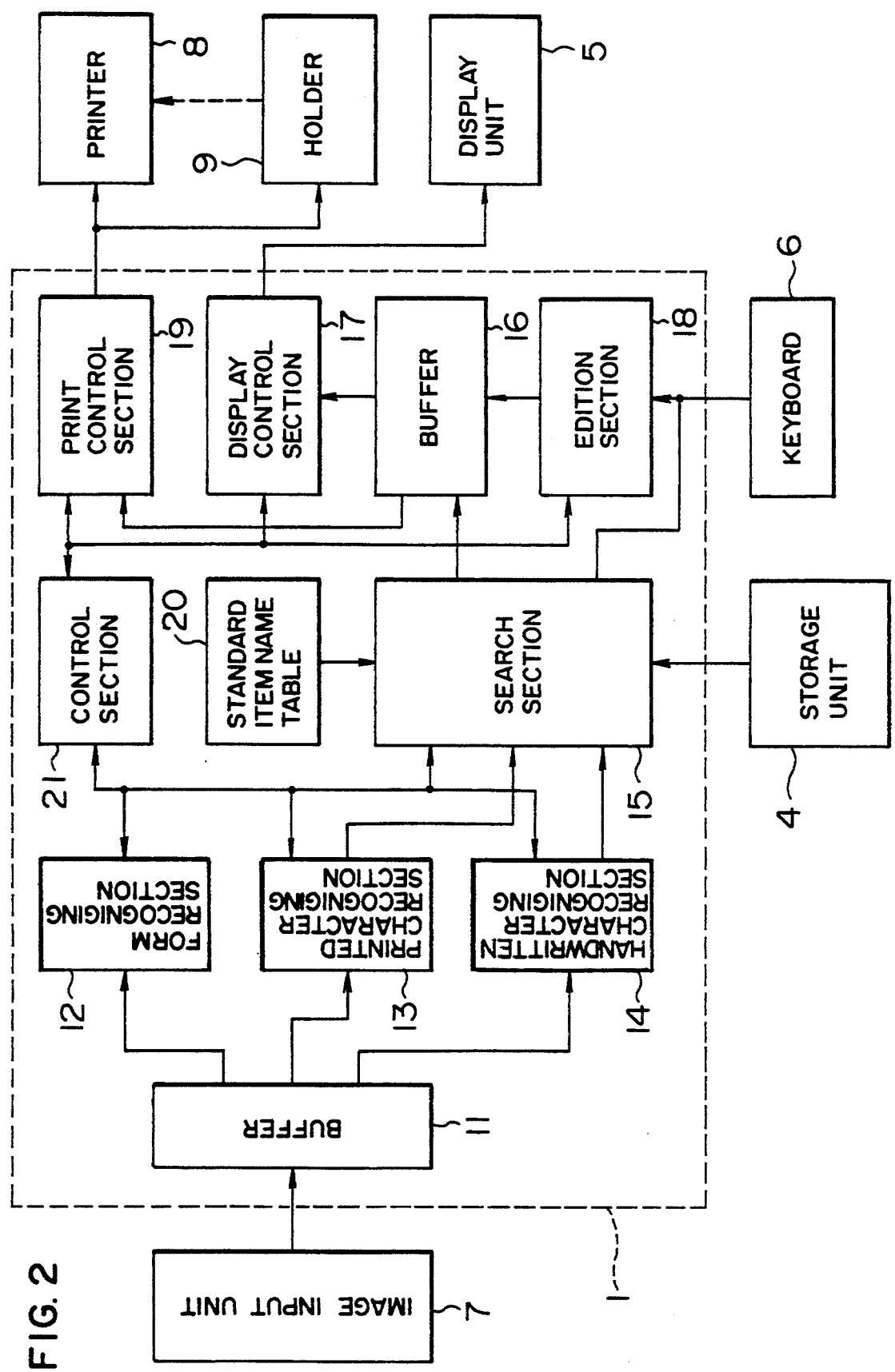
FIG. 2 shows a functional configuration of the document making system of the first embodiment.

Referring to FIG. 2, a functional configuration of the computer system 1 will be explained. A control section 21 controls sections to be described below. An image of the blank entered from the image input unit 7 is stored in a buffer 11. A form recognition section 12 recognizes the form of the blank such as a table or other aspects of the layout of the blank document in response to an instruction from the section 21 and generates form data based on the recognition result. A position of each ruled line is detected from the left top of the blank, and positions of characters which constitute each printed item and hand-written characters from the left top of the blank are detected from the detected positions of the ruled lines. Form data is generated from data indicating the detected positions of the ruled lines and the detected positions of the characters. Further, print control data necessary for a normal print operation such as a character pitch of characters to be printed, a line pitch and a margin are generated. The form data is supplied to a printed character recognition section 13, a hand-written character recognition section 14 and a search section 15, and the print control data is supplied to the section 15.

The printed character recognition section 13 recognizes characters of each item printed on the blank in accordance with the form data, in response to an instruction from the section 21, and the recognition result is outputted to the section 15. The hand-written character recognition section 14 recognizes the hand-written characters written on the blank in accordance with the form data, in response to an instruction from the control section 21, and the recognition result is outputted to the search section 15.

The search section 15 pairs each of the items recognized by the section 13 and the written data recognized by the section 14 in the corresponding column, and stores them into a buffer table in a buffer 16, in response to an instruction from the section 21. In a case where there is no written data, "NULL" is set as the written data. The search section 15 also refers to a standard item table 20 based on each item recognized by the printed character recognition section 13 and converts the item to a standard item. The search section 15 further generates a search condition based on the standard item and the written data, reads out a database table from the storage unit 4 and stores the same into the buffer 16. Item data is retrieved from the database table in accordance with the search condition, and the retrieved item data is registered at the corresponding positions in the buffer table of the buffer 16.

A display control section 17 displays a content of the buffer table on a screen of the display unit 5 in response to an instruction from the section 21. A print control unit 19 controls the printer 8 to print out the data stored in the buffer table on the blank in accordance with the print control data stored in the buffer 16. An edit section 18 modifies and edits the data in the buffer table in accordance with an input from a keyboard 6.

An operation of the present embodiment will be now explained.

Figure 3:
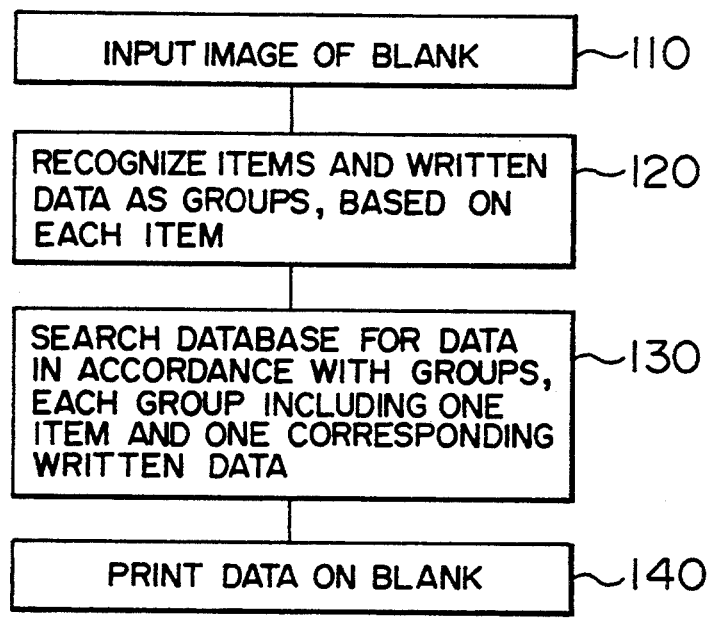
FIG. 3 shows a flow chart of a process in the first embodiment of the present invention.

FIG. 3 is a flow chart showing a main process in the present embodiment. In a step 110, a form of a blank is read in the buffer 11 as image data. In a step 120, data recognized by the hand-written character recognition section 14 and an item associated with the data are paired. In a step 130, the database in the storage unit 4 is searched based on the pair. In a step 140, the retrieved data from the database is outputted onto the blank in accordance with the form.

Details of the respective steps will be now explained.

In the step 110 shown in FIG. 3, the form of the blank is read in the buffer 11 by the image input unit 7 as the image data. In the present embodiment, an application blank shown in FIG. 7 is used. On the application blank, name, age, address, telephone number and occupation of an applicant are to be written. In the present example, an applicant's name "Masakazu Hitachi" has already been written on a column "your name" of the application blank. In the document making system of the present embodiment, a user writes his/her name in the application blank and inputs the image of the application blank. Then, the personal data relating to the applicant is outputted on the application blank.

In the step 120, the stored image data is analyzed, and each item and the corresponding written data are recognized as a pair.

More specifically, the form or layout of the application blank is recognized by the form recognition section 12 in response to an instruction from the control section 21, and form data and print control data are generated based on the recognition result. The form data is outputted to the printed character recognition section 13, the hand-written character recognition section 14 and the search section 15, and the print control data is outputted to the section 15. The section 13 recognizes characters of each item printed on the application blank in accordance with the form data in response to an instruction from the section 21, and the recognition result is outputted to the section 15. The handwritten character recognition section 14 recognizes the characters hand-written on the application blank in accordance with the form data in response to an instruction from the control section 21, and the recognition result is outputted to the section 15.

The section search 15 pairs each of the items recognized by the section 13 and the corresponding written data recognized by the section 14 in the corresponding column and stores each pair into the buffer table in the buffer 16, in response to an instruction from the section 21. The data stored in the buffer 16 is displayed on the screen of the display unit 5 by the display control section 17 in response to an instruction from the section 21. FIG. 8 shows an output example of the application blank of FIG. 7. The recognized items are registered in an item field 201 of the table shown in FIG. 8, and the data on the blank is registered in a written data field 203. For the field in which no data has been written, data "NULL" is registered.

The step 130 of FIG. 3 will be explained in more detail with reference to FIG. 4 which shows a detailed flow chart of the step 130 of FIG. 3.

First, in a step 310, each item is standardized. That is, each item stored in the buffer 16 is standardized by using a standard item table 20. The table 20 used in the present example is shown in FIG. 9. In general, there are variations in the expression of the item on the blank on which data of individual is to be written. For example, "name" is expressed as "full name" or "your name". However, since only one item, e.g., "name" is registered in the database, it is necessary to change the different expressions of the same content to a unified expression in order to allow the search of the database.

In the present embodiment, the standard item table 20 shown in FIG. 9 is referenced to search for the registered item so that the standard item is retrieved. The retrieved standard item is registered in the standard item field 202 shown in FIG. 8. FIG. 10 shows the standard items registered in the buffer table.

Figure 4:
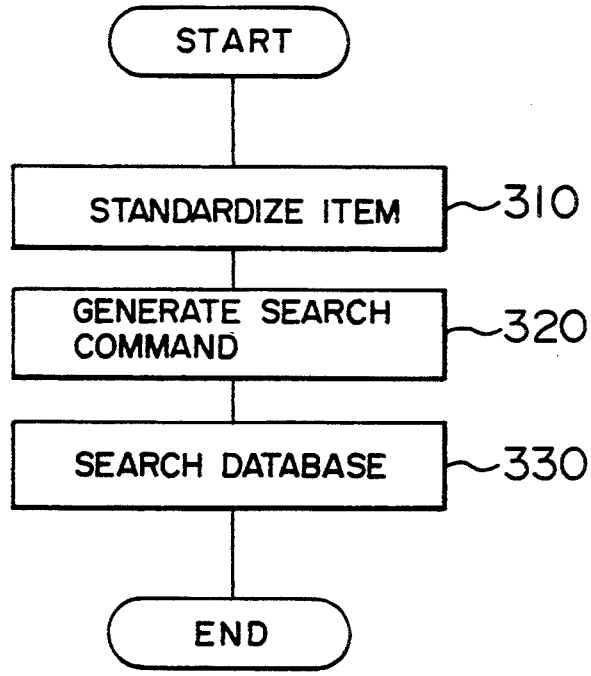
FIG. 4 shows a detailed flow chart of a search process for a database.
Figures 5, 6:
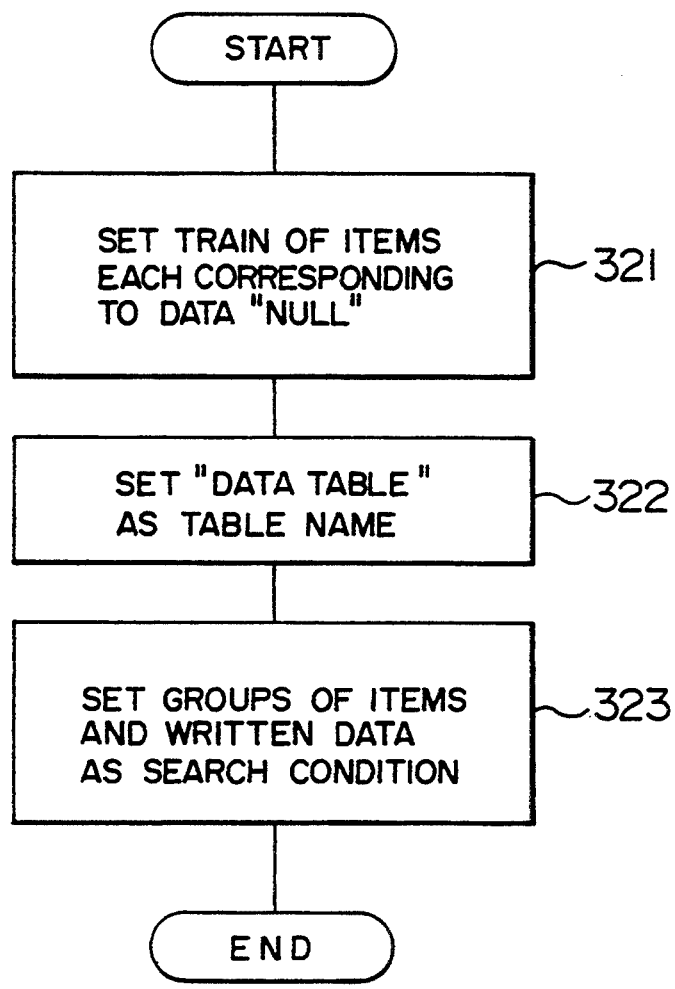
FIG. 5 shows a format of a database search language.
FIG. 6 shows a detailed flow chart of a search condition formula generation process.

In the step 320 shown in FIG. 4, a search command for the database is generated. FIG. 12 shows a portion of the content of the database used in the present embodiment. The database relates to data of individuals. In the present embodiment, a Relational database is used. An SQL command is used to search data from the Relational database. A format thereof is shown in FIG. 5. Note that a network database or a hierachy database may also be applicable to the present invention if a corresponding search language is used.

In the SQL, items to be searched are described following to "SELECT", a table name to be searched is described following to "FROM", and a search condition is described following to "WHERE". A more detailed operation of the step 320 of FIG. 4 is shown in FIG. 6.

FIG. 6 is a flow chart showing a search command generation process. In a step 321, items which are registered as the standard items in the table of FIG. 10 and which have data "NULL" are set as items in the search command. In the example shown in FIG. 10, "age", "address", "telephone No." and "occupation" are set.

In a step 322, "data table" which is the name of the relational database used in the present embodiment is set as the name of table to be searched in the search command. In a step 323, for each of the standard items which have data other than data "NULL", a condition statement is generated by setting:

"standard item=written data"

This condition statement describes the content that "on a condition that an item registered in the standard item field has corresponding data registered in the written data field". In the example of FIG. 10, it is "name=Masakazu Hitachi"

FIG. 11 shows an example of the generated search command.

In a step 330, the database table having "table name", that is, "data table" is read out from the storage unit 4 by using the generated search command and is stored into the buffer 16. Then, the data of the search items are searched in accordance with the condition statement. The search result is registered in those columns of the written data field 203 shown in FIG. 10 in which data "NULL" has been registered. The registration result is displayed on the screen of the display unit 5 by the section 17. FIG. 13 shows the display of the registration result.

In the step 140 of FIG. 3, the retrieved data is printed out on the application blank. The print control data generated by the section 12 has been stored in the buffer 16 through the search section 15. When the control section 21 receives a notice of the end of search process from the search section 15, it provides a print start command to the print control section 19. In response to the command, the section 19 selects a corresponding application blank from the holder 9 and sends it to the printer 6. The printer 6 sets the application blank by using the left top of the application blank as a reference. Then, the retrieved data is outputted on the application blank in accordance with the print control data. The data of individuals in the fields 401 and 403 are outputted on the application blank in accordance with the form of the application blank. An example of printout is shown in FIG. 14.

Figure 15:
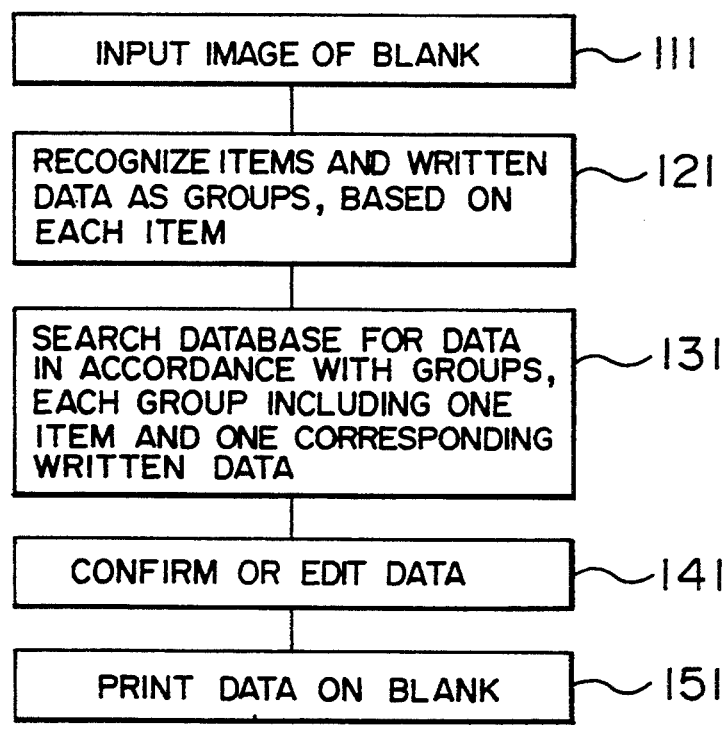
FIG. 15 shows a flow chart of a process in a second embodiment.

Another embodiment of the present invention will be now explained with reference to FIG. 15. Steps 111, 121, 131 and 151 shown in FIG. 15 are identical to the steps 110-130 and 140 of the flow chart (FIG. 3) of the first embodiment of the present invention. A feature of the present embodiment resides in a step 141 in which search result is verified and modified.

In the step 141, the search result is verified and modified. In the first embodiment, the table of FIG. 13 is displayed on the terminal screen, and it is verified by a user. Then, the document is outputted in accordance with the form in the step 151. In the step 141, the user can modify the table.

In the first and second embodiments, the search result is printed out on an application blank different from the application blank entered into the image input unit 7 but having the same form. In a case where the holder 9 is omitted, the image input unit 7 and the printer 8 are combined as a unit, and the application blank entered into the unit 7 is set in the printer 8, it is possible to print out data other than the pre-written data. The buffer 11 can be shared with the buffer 16 and the entire application blank can be printed out.

A system in which the computer 1 and the storage unit 4 are located at distant places from the units 5 to 9 and the data is transmitted therebetween is within the scope of the present invention.

In accordance with the present embodiment, data is automatically entered into the item of the application blank so that the entry work can be saved.

The above embodiments are shown to illustrate the present embodiment and the present invention is not limited to those embodiments. For example, the computer 1 shown in the embodiment may be a word processor.

In accordance with the document making system of the present invention, the data can be simply retrieved from the database and the retrieved data can be outputted on the blank in accordance with the form.

What is claimed is:

1. A method for completing a form document which is partially completed with written data, the method being executed by a computer system and comprising the steps of;

reading an image of the form document together with the written data written onto the form document as image data and storing the image data in a memory of the computer system;

recognizing in the image data i) a format of the form document and ii) key information comprising intelligible characters in said written data;

automatically retrieving first data from a database in the memory of the computer system based on the recognized key information; and, printing at least a part of the retrieved first data onto said form document in accordance with the recognized format of the form document.

2. A method according to claim 1 wherein said automatically retrieving step includes the steps of:

automatically generating a search command in accordance with the recognized key information; and, automatically retrieving the first data from the database in accordance with the automatically generated search command.

3. A method according to claim 2 wherein said automatically generating a search command step includes the steps of:

standardizing the recognized key information into standardized key information by automatically referring to a standard item table; and, generating the search command in accordance with the standardized key information.

4. A method according to claim 1 wherein the key information recognizing step includes recognizing printed item data and hand-written data based on the intelligible characters comprising said written data.

5. A method according to claim 4 wherein:
said recognizing step comprises the step of recognizing each of the printed item data and corresponding handwritten data as a set, and
said automatically retrieving step comprises the steps of:
automatically generating a search command for retrieving the first data for each printed item data having no corresponding hand-written data on a condition of the recognized set; and
automatically retrieving the first data from the database in accordance with the generated search command.

6. A method according to claim 4 wherein:
the step of recognizing said handwritten data includes the step of recognizing a name of a first person; and,
the automatically retrieving step includes automatically retrieving data of said first person from said database based on the name of said first person.

7. A method according to claim 4 wherein said printing step comprises the step of printing the retrieved first data on a second form document in accordance with the recognized format.

8. A method according to claim 7 wherein said printing step comprises the step of printing the recognized printed item data as well as the retrieved first data on the second form document in accordance with the recognized format.

9. A system for completing a blank form document which is partially completed with first information written onto a blank portion of the form document, the system comprising:
an image input unit for reading an image of the blank form document together with said first information as image data;
a recognition unit for recognizing in the image data a format of the blank form document and key information comprising intelligible characters in said first information written onto said form document;
a first memory for storing a database;
retrieval means for automatically retrieving first data from said database based on the key information; and,
output means for printing at least part of the retrieved first data onto said blank form document based on the recognized format of the blank form document.

10. A system according to claim 9 wherein the recognition unit includes means for recognizing printed word item data and handwritten word item data in said key information.

11. A system according to claim 10 wherein said retrieval means includes:
means for automatically generating a search command based on the recognized printed word item data and the handwritten word item data; and,
means for automatically retrieving the first data from said database in accordance with the generated search command.

12. A system according to claim 11 wherein said automatic generating means includes:
a second memory for storing a standard item table;
conversion means for converting the recognized printed word item data and handwritten word item data into standardized item data automatically by referring to said standard item table; and,
means for generating the search command based on the converted standardized item data and the recognized handwritten word item data.

13. A system according to claim 10 wherein said recognition unit includes:
means for recognizing the printed word item data and the corresponding handwritten word item data as a set, and said retrieval means includes:
means for automatically generating the search command to retrieve the first data for printed word items having no corresponding handwritten word item data based on the recognized set; and,
means for automatically retrieving the first data from said database based on the generated search command.

14. A system according to claim 10 wherein the recognition unit includes means for recognizing names of persons in said handwritten word item data and said database comprises data of persons.

15. A method for completing a blank form document which is partially completed by first information disposed in a blank space on the form document, the method being executed by a computer system and comprising the steps of:
reading an image of the blank form document together with said first information as image data;
storing said image data in a memory;
recognizing in the image data i) a layout format of the blank form document and ii) key information comprising intelligible characters in said first information;
automatically retrieving first data from a database based on the key information;
editing the retrieved first data; and,
outputting the edited data onto the blank form document based on the recognized format of the blank form document.

16. A method according to claim 15 wherein the key information recognizing step includes recognizing printed word data items and handwritten word data items written into said blank space on said form document.

17. A method according to claim 16 wherein said automatically retrieving step comprises the steps of:
automatically generating a search command in accordance with the recognized printed word data items and the recognized handwritten word data items; and,
automatically retrieving the first data from the database in accordance with the generated search command.

18. A method according to claim 17 wherein said step of automatically generating the search command comprises the steps of:
converting the recognized key information into standardized key information by automatically referring to a standard item table; and,
generating the search command in accordance with the standardized key information and the recognized printed word data items and handwritten word data items.

19. A method according to claim 16 wherein:
said recognizing step comprises the step of recognizing each of the recognized printed word data items and the corresponding handwritten data items as a set; and, said retrieving step comprises the steps of:

automatically generating the search command to retrieve the first data for each printed word data item having no corresponding handwritten word data item based on the recognized set; and, automatically retrieving the first data from said database in accordance with the generated search command.

* * * * *